(12) United States Patent
Chen et al.

(10) Patent No.: US 7,153,366 B1
(45) Date of Patent: *Dec. 26, 2006

(54) SYSTEMS AND METHOD FOR FORMING A SERVO PATTERN ON A MAGNETIC TAPE

(75) Inventors: Hong Chen, Worcester, MA (US); Joseph M. Panish, Littleton, MA (US); Tzuo-Chang Lee, Shrewsbury, MA (US); Leo Cappabianca, Worcester, MA (US)

(73) Assignee: Quantum Corporation, San Jose, CA (US)

( * ) Notice: Subject to any disclaimer, the term of this patent is extended or adjusted under 35 U.S.C. 154(b) by 344 days.

This patent is subject to a terminal disclaimer.

(21) Appl. No.: 09/718,818

(22) Filed: Nov. 22, 2000

Related U.S. Application Data

(60) Division of application No. 09/361,669, filed on Jul. 27, 1999, which is a continuation-in-part of application No. 09/046,723, filed on Mar. 24, 1998, now abandoned.

(51) Int. Cl.
*B05B 5/025* (2006.01)
*G11B 5/584* (2006.01)

(52) U.S. Cl. .................. 118/620; 118/641; 118/506; 360/77.12

(58) Field of Classification Search ............. 156/345.2; 219/121.16, 121.68, 121.76, 121.77, 121.69, 219/73; 216/65, 22, 94; 360/77.12, 71, 360/75, 72.1, 78.02; 347/224; 118/620, 118/641, 506
See application file for complete search history.

(56) References Cited

U.S. PATENT DOCUMENTS

| | | | |
|---|---|---|---|
| 2,923,781 A | 2/1960 | Gordon et al. | |
| 3,113,179 A | 12/1963 | Glenn, Jr. | |
| 3,239,841 A | 3/1966 | Henkes, Jr. | |
| 3,404,392 A | 10/1968 | Sordello | |

(Continued)

FOREIGN PATENT DOCUMENTS

CH   586 944   4/1977

(Continued)

OTHER PUBLICATIONS

European Search Report mailed on Aug. 22, 2003, for European Patent Application No. 03252726.9 filed on Apr. 30, 2003, and published on Nov. 12, 2003 as European Publication No. 1 361 568, 3 pages.

(Continued)

*Primary Examiner*—Chris Fiorilla
*Assistant Examiner*—Yewebdar Tadesse
(74) *Attorney, Agent, or Firm*—Morrison & Foerster LLP

(57) ABSTRACT

The systems, methods and products of the invention include systems and methods for manufacturing servo tracks on a magnetic tape. In one aspect, the invention includes systems for manufacturing magnetic tapes having servo tracks thereon wherein the servo tracks are optically detectable and are capable of being processed by a servo control system for maintaining alignment of a magnetic recording head with the data tracks on the recording side of the magnetic tape. In one practice, the manufacturing systems described herein engrave the servo tracks onto the non-recording side of a magnetic tape by directing a laser beam at the non- recording side of the magnetic tape. In another practice, the manufacturing systems described herein engrave the servo tracks onto the magnetic side of a magnetic tape by directing a laser beam at the magnetic side of the magnetic tape. Such engraved patterns can act as optical servo tracks for maintaining alignment of the recording head with the data tracks on the magnetic tape.

42 Claims, 14 Drawing Sheets

U.S. PATENT DOCUMENTS

| | | |
|---|---|---|
| 3,426,337 A | 2/1969 | Black et al. |
| 3,610,721 A * | 10/1971 | Abramson ..................... 359/5 |
| 3,637,991 A | 1/1972 | Yanagawa |
| 3,662,120 A | 5/1972 | Hess |
| 3,768,752 A | 10/1973 | Bettini et al. |
| 3,786,752 A | 1/1974 | Lingens et al. |
| 3,790,755 A | 2/1974 | Silverman |
| 3,838,291 A | 9/1974 | Marion et al. |
| 3,914,793 A | 10/1975 | Burnham |
| 3,916,039 A | 10/1975 | Akashi et al. |
| 3,980,480 A | 9/1976 | Lairidon et al. |
| 3,997,715 A | 12/1976 | Elliott |
| 4,008,085 A | 2/1977 | Lemahieu et al. |
| 4,123,788 A | 10/1978 | Kruger |
| 4,136,347 A * | 1/1979 | Braitberg ..................... 347/113 |
| 4,176,381 A | 11/1979 | De Neil et al. |
| 4,275,425 A | 6/1981 | Watanabe et al. |
| 4,313,143 A | 1/1982 | Zarr |
| 4,315,283 A | 2/1982 | Kinjo et al. |
| 4,340,305 A | 7/1982 | Smith et al. |
| 4,371,904 A | 2/1983 | Brooke |
| 4,380,032 A | 4/1983 | Pfost |
| 4,422,111 A | 12/1983 | Moeller et al. |
| 4,531,205 A | 7/1985 | Faugeras |
| 4,558,383 A | 12/1985 | Johnson |
| 4,570,191 A | 2/1986 | Di Stefano et al. |
| 4,578,311 A | 3/1986 | Ishikuro et al. |
| 4,626,469 A | 12/1986 | Yamaguchi et al. |
| 4,633,451 A | 12/1986 | Ahn et al. |
| 4,679,104 A | 7/1987 | Dahlerud |
| 4,684,547 A | 8/1987 | DiStefano et al. |
| 4,737,877 A | 4/1988 | Krongelb et al. |
| 4,746,542 A | 5/1988 | Chino et al. |
| 4,750,067 A | 6/1988 | Gerfast |
| 4,759,991 A | 7/1988 | Kanno et al. |
| 4,775,969 A | 10/1988 | Osterlund |
| 4,788,129 A * | 11/1988 | Bouldin et al. ........ 430/270.11 |
| 4,802,030 A | 1/1989 | Henry et al. |
| 4,816,939 A | 3/1989 | Ford et al. |
| 4,816,941 A | 3/1989 | Edel et al. |
| 4,833,556 A * | 5/1989 | Kosarko et al. ....... 360/130.31 |
| 4,843,494 A | 6/1989 | Cronin et al. |
| 4,848,698 A | 7/1989 | Newell et al. |
| 4,868,046 A | 9/1989 | Moriizumi et al. |
| 4,876,886 A | 10/1989 | Bible et al. |
| 4,884,260 A | 11/1989 | Bouldin et al. |
| 4,935,835 A | 6/1990 | Godwin et al. |
| 4,937,810 A | 6/1990 | Drexler et al. |
| 4,958,245 A | 9/1990 | Roth et al. |
| 4,961,123 A | 10/1990 | Williams et al. |
| 4,969,058 A | 11/1990 | Williams et al. |
| 4,983,496 A | 1/1991 | Newell et al. |
| 5,008,765 A | 4/1991 | Youngquist |
| 5,016,240 A | 5/1991 | Strandjord et al. |
| 5,038,030 A | 8/1991 | Hayashi et al. |
| 5,050,017 A | 9/1991 | Carr et al. |
| 5,060,212 A | 10/1991 | Fujita et al. |
| 5,065,387 A | 11/1991 | Roth et al. |
| 5,067,039 A | 11/1991 | Godwin et al. |
| 5,073,884 A | 12/1991 | Kobayashi |
| 5,080,479 A | 1/1992 | Rosenberg |
| 5,097,351 A | 3/1992 | Kramer |
| 5,105,322 A | 4/1992 | Steltzer |
| 5,111,448 A | 5/1992 | Komma et al. |
| 5,120,927 A | 6/1992 | Williams et al. |
| 5,121,371 A | 6/1992 | Farnsworth et al. |
| 5,122,727 A | 6/1992 | Janssen et al. |
| 5,144,604 A | 9/1992 | Sugiura |
| 5,163,032 A | 11/1992 | Van Nieuwland et al. |
| 5,179,463 A | 1/1993 | Kramer |
| 5,196,297 A | 3/1993 | Dombrowski et al. |
| 5,196,969 A | 3/1993 | Iwamatsu et al. |
| 5,210,672 A | 5/1993 | Ivers et al. |
| 5,218,595 A | 6/1993 | Lehureau et al. |
| 5,229,620 A | 7/1993 | Pahr |
| 5,262,908 A | 11/1993 | Iwamatsu et al. |
| 5,279,775 A | 1/1994 | Thomas et al. |
| 5,280,402 A | 1/1994 | Anderson et al. |
| 5,283,773 A | 2/1994 | Thomas et al. |
| 5,293,367 A | 3/1994 | Kadowaki et al. |
| 5,311,378 A | 5/1994 | Williams et al. |
| 5,319,507 A | 6/1994 | Umebayashi et al. |
| 5,322,987 A | 6/1994 | Thomas et al. |
| 5,331,621 A | 7/1994 | Miyake et al. |
| 5,333,091 A | 7/1994 | Iggulden et al. |
| 5,334,849 A | 8/1994 | Thomas et al. |
| 5,349,484 A | 9/1994 | Koehler |
| 5,363,255 A | 11/1994 | Ivers et al. |
| 5,369,631 A | 11/1994 | Hwang |
| 5,371,636 A | 12/1994 | Nayak et al. |
| 5,379,170 A | 1/1995 | Schwarz |
| 5,379,283 A | 1/1995 | Miyajima |
| 5,382,463 A | 1/1995 | Adkins et al. |
| 5,414,578 A | 5/1995 | Lian et al. |
| 5,414,585 A | 5/1995 | Saliba |
| 5,432,652 A | 7/1995 | Comeaux et al. |
| 5,448,430 A | 9/1995 | Bailey et al. |
| 5,450,257 A | 9/1995 | Tran et al. |
| 5,452,152 A | 9/1995 | Rudi |
| 5,457,586 A | 10/1995 | Solhjell |
| 5,462,823 A | 10/1995 | Evans et al. |
| 5,475,670 A | 12/1995 | Hamada et al. |
| 5,475,673 A | 12/1995 | Adkins |
| 5,493,554 A | 2/1996 | Sasaki et al. |
| 5,510,140 A | 4/1996 | Kurose et al. |
| 5,515,212 A | 5/1996 | Chiao et al. |
| 5,518,804 A | 5/1996 | Mizuno et al. |
| 5,523,904 A | 6/1996 | Saliba |
| 5,532,042 A | 7/1996 | Kawarai et al. |
| 5,535,069 A | 7/1996 | Chiao et al. |
| 5,535,190 A | 7/1996 | Moore et al. |
| 5,563,868 A | 10/1996 | Farnsworth et al. |
| 5,566,033 A | 10/1996 | Frame et al. |
| 5,579,717 A | 12/1996 | Crandell et al. |
| 5,581,523 A | 12/1996 | Seki et al. |
| 5,589,247 A | 12/1996 | Wallack et al. |
| 5,606,542 A | 2/1997 | Kim |
| 5,615,205 A | 3/1997 | Belser |
| 5,633,844 A | 5/1997 | Maeda et al. |
| 5,648,946 A | 7/1997 | Yamazaki |
| 5,648,951 A | 7/1997 | Kato et al. |
| 5,655,475 A | 8/1997 | Crandell et al. |
| 5,661,616 A | 8/1997 | Tran et al. |
| 5,661,823 A | 8/1997 | Yamaguchi et al. |
| 5,674,583 A | 10/1997 | Nakayama et al. |
| 5,675,448 A | 10/1997 | Molstad et al. |
| 5,677,806 A | 10/1997 | Eckberg et al. |
| 5,680,278 A | 10/1997 | Sawtell, Jr. |
| 5,687,155 A | 11/1997 | Fukakusa et al. |
| 5,689,384 A | 11/1997 | Albrecht et al. |
| 5,705,268 A | 1/1998 | Ishikawa et al. |
| 5,717,674 A | 2/1998 | Mori et al. |
| 5,718,964 A | 2/1998 | Naoe et al. |
| 5,726,834 A | 3/1998 | Eckberg et al. |
| 5,729,519 A | 3/1998 | Nakanishi et al. |
| 5,774,313 A | 6/1998 | Tanaka et al. |
| 5,815,482 A | 9/1998 | Rope et al. |
| 5,855,589 A | 1/1999 | McEwen et al. |
| 5,858,589 A | 1/1999 | Govaert et al. |
| 5,872,675 A | 2/1999 | Solhjell |
| 5,877,910 A | 3/1999 | Williams et al. |
| 5,886,645 A | 3/1999 | Eaton |
| 5,906,867 A | 5/1999 | Kaige et al. |
| 5,914,151 A | 6/1999 | Usuki |

| | | | | | |
|---|---|---|---|---|---|
| 5,917,790 A | 6/1999 | Ohta et al. | EP | 0 484 775 | 5/1992 |
| 5,928,761 A | 7/1999 | Hedblom et al. | EP | 0 484 779 | 5/1992 |
| 5,982,592 A * | 11/1999 | Saito et al. ............ 360/130.31 | EP | 0 484 780 | 5/1992 |
| 5,993,948 A | 11/1999 | Yamazaki et al. | EP | 0 496 132 | 7/1992 |
| 6,018,434 A | 1/2000 | Saliba | EP | 0 496 461 | 7/1992 |
| 6,031,671 A | 2/2000 | Ayres | EP | 0 549 845 | 7/1993 |
| 6,033,752 A | 3/2000 | Suzuki et al. | EP | 0 549 854 | 7/1993 |
| 6,063,489 A | 5/2000 | Kobayashi et al. | EP | 0 555 511 | 8/1993 |
| 6,075,676 A | 6/2000 | Hiraoka et al. | EP | 0 564 187 | 10/1993 |
| 6,075,678 A | 6/2000 | Saliba | EP | 0 645 043 | 12/1993 |
| 6,084,740 A | 7/2000 | Leonhardt et al. | EP | 0 645 044 | 12/1993 |
| 6,103,365 A | 8/2000 | Ishii et al. | EP | 0 655 960 | 12/1993 |
| 6,108,159 A | 8/2000 | Nute et al. | EP | 0 598 503 | 5/1994 |
| 6,160,568 A * | 12/2000 | Brodsky et al. ............ 347/247 | EP | 0 606 710 | 7/1994 |
| 6,162,532 A | 12/2000 | Black et al. | EP | 0 684 597 | 11/1995 |
| 6,236,529 B1 | 5/2001 | Leonhardt et al. | EP | 0 854 471 | 7/1998 |
| 6,246,535 B1 | 6/2001 | Saliba et al. | EP | 1 026 665 A1 | 8/2000 |
| 6,275,349 B1 | 8/2001 | Smith | EP | 1 026 667 A1 | 8/2000 |
| 6,284,361 B1 | 9/2001 | Kobayashi et al. | EP | 1 029 666 A1 | 8/2000 |
| 6,319,595 B1 | 11/2001 | Katashima et al. | EP | 1 117 092 A2 | 7/2001 |
| 6,365,061 B1 * | 4/2002 | Damer et al. .................. 216/65 | EP | 1 205 912 | 5/2002 |
| 6,396,776 B1 * | 5/2002 | Ueyanagi ................. 369/13.33 | EP | 1 205 913 | 5/2002 |
| 6,433,951 B1 | 8/2002 | Lubratt | EP | 1 288 920 A2 | 3/2003 |
| 6,480,351 B1 | 11/2002 | Leonhardt et al. | FR | 2 315 142 | 1/1977 |
| 6,493,174 B1 | 12/2002 | Stubbs | GB | 2 008 290 | 5/1979 |
| 6,558,774 B1 * | 5/2003 | Saliba et al. ................. 428/156 | GB | 1 595 136 | 8/1981 |
| 6,563,662 B1 | 5/2003 | Smith | GB | 2 121 227 | 12/1983 |
| 6,768,608 B1 | 7/2004 | Saliba et al. | GB | 2 335 785 A | 9/1999 |
| 6,961,200 B1 * | 11/2005 | Lee et al. .................. 360/72.1 | JP | 56-111169 | 9/1981 |
| 6,980,390 B1 | 12/2005 | Saliba | JP | 57-050346 | 3/1982 |
| 2001/0006437 A1 | 7/2001 | Leonhardt et al. | JP | 57-120230 | 7/1982 |
| 2002/0021524 A1 | 2/2002 | Saliba et al. | JP | 57-120255 | 7/1982 |
| 2002/0041981 A1 | 4/2002 | Ishikawa et al. | JP | 61-142530 | 6/1986 |
| 2002/0141103 A1 | 10/2002 | Saliba et al. | JP | 61-293372 | 12/1986 |
| 2002/0167751 A1 | 11/2002 | Lee et al. | JP | 62-192025 | 8/1987 |
| 2002/0186496 A1 | 12/2002 | Saliba et al. | JP | 63-148416 | 6/1988 |
| 2005/0057846 A1 | 3/2005 | Saliba | JP | 63-251924 | 10/1988 |
| | | | JP | 64-070916 | 3/1989 |
| FOREIGN PATENT DOCUMENTS | | | JP | 2-169915 | 6/1990 |
| DE | 24 06 292 | 8/1975 | JP | 2-188915 | 7/1990 |
| DE | 26 16 362 | 11/1977 | JP | 3-094881 | 4/1991 |
| DE | 32 01 935 | 8/1983 | JP | 3-141087 | 6/1991 |
| DE | 34 17 426 | 11/1985 | JP | 3-201215 | 9/1991 |
| DE | 41 42 052 | 7/1992 | JP | 3-219432 | 9/1991 |
| EP | 0 069 548 | 1/1983 | JP | 3-242816 | 10/1991 |
| EP | 0 083 753 | 7/1983 | JP | 4-003832 | 1/1992 |
| EP | 0 097 774 | 1/1984 | JP | 4-038632 | 2/1992 |
| EP | 0 108 258 | 5/1984 | JP | 4-059399 | 2/1992 |
| EP | 0 119 568 | 9/1984 | JP | 4-252417 | 9/1992 |
| EP | 0 130 495 | 1/1985 | JP | 4-305844 | 10/1992 |
| EP | 0 155 000 | 9/1985 | JP | 5-073883 | 3/1993 |
| EP | 0 166 199 | 1/1986 | JP | 6-020414 | 1/1994 |
| EP | 0 177 737 | 4/1986 | JP | 6-139549 | 5/1994 |
| EP | 0 180 258 | 5/1986 | JP | 6-243619 | 9/1994 |
| EP | 0 189 948 | 8/1986 | JP | 6-259736 | 9/1994 |
| EP | 0 224 005 | 11/1987 | JP | 6-293372 A | 10/1994 |
| EP | 0 257 713 | 3/1988 | JP | 7-029136 | 1/1995 |
| EP | 0 311 485 | 4/1989 | JP | 7-057412 | 3/1995 |
| EP | 0 311 859 | 4/1989 | JP | 7-065434 | 3/1995 |
| EP | 0 336 419 | 10/1989 | JP | 7-182626 A | 7/1995 |
| EP | 0 344 759 | 12/1989 | JP | 7-220255 | 8/1995 |
| EP | 0 347 074 | 12/1989 | JP | 7-082626 | 9/1995 |
| EP | 0 351 837 | 1/1990 | JP | 8-174669 | 7/1996 |
| EP | 0 353 007 | 1/1990 | JP | 8-278614 A | 10/1996 |
| EP | 0 368 268 | 5/1990 | JP | 9-007131 | 1/1997 |
| EP | 0 368 269 | 5/1990 | JP | 9-033773 | 2/1997 |
| EP | 0 390 555 | 10/1990 | JP | 9-035246 | 2/1997 |
| EP | 0 423 662 | 4/1991 | JP | 9-265626 | 10/1997 |
| EP | 0 434 230 | 6/1991 | JP | 9-288813 A | 11/1997 |
| EP | 0 443 810 | 8/1991 | JP | 9-289885 | 11/1997 |
| EP | 0 535 112 | 12/1991 | JP | 9-289973 | 11/1997 |
| EP | 0 484 774 | 5/1992 | JP | 9-297914 | 11/1997 |
| | | | JP | 9-320197 | 12/1997 |

| | | |
|---|---|---|
| JP | 10-043924 | 2/1998 |
| JP | 10-190867 | 7/1998 |
| JP | 10-251432 | 9/1998 |
| JP | 10-297181 | 11/1998 |
| JP | 11-066529 | 3/1999 |
| JP | 11-066745 | 3/1999 |
| JP | 11-096705 | 4/1999 |
| JP | 11-126328 | 5/1999 |
| JP | 11-154312 | 6/1999 |
| JP | 11-161928 | 6/1999 |
| JP | 11-213383 A | 8/1999 |
| JP | 11-213384 A | 8/1999 |
| JP | 11-242814 A | 9/1999 |
| JP | 11-339254 A | 12/1999 |
| JP | 11-353642 A | 12/1999 |
| JP | 2001-067652 A | 3/2001 |
| JP | 2001-076326 A | 3/2001 |
| KR | 9406847 | 7/1994 |
| SU | 1137513 | 1/1985 |
| WO | WO 83/01858 | 5/1983 |
| WO | WO 85/02933 | 7/1985 |
| WO | WO 85/03376 | 8/1985 |
| WO | WO 88/02168 | 3/1988 |
| WO | WO-91/20077 A1 | 12/1991 |
| WO | WO-93/25343 A1 | 12/1993 |
| WO | WO-93/26004 A1 | 12/1993 |
| WO | WO-93/26007 A1 | 12/1993 |
| WO | WO 94/12975 | 6/1994 |
| WO | WO 99/21178 | 4/1999 |
| WO | WO 99/21179 | 4/1999 |
| WO | WO 99/27530 | 6/1999 |
| WO | WO 99/28909 | 6/1999 |
| WO | WO-00/30079 A1 | 5/2000 |
| WO | WO 00/49604 | 8/2000 |
| WO | WO 00/49605 | 8/2000 |
| WO | WO-00/49607 A2 | 8/2000 |

OTHER PUBLICATIONS

Hoagland, A. S. (Mar. 1978). "Optical Servo of Magnetic Recording," *IBM Technical Disclosure Bulletin* 20(10):4108-4109.

Ishiguro, H. et al. (Feb. 10, 1996). "A Laser-Detector-Hologram Unit with IV Amplifiers and Built-in Micro-Mirror," *IEEE International Solid-State Circuits Conference, ISSCC96, Session 20, Sensor Circuits, Paper SA* 20.3, 20.3:330-331.

Johnson, M. (Aug. 1990). "Spatial Filtering For Storage Technology," *IBM Technical Disclosure Bulletin* 33(3A):191-193.

Lambert, S. E. et al. (Apr. 1990). "Servo Scheme for Patterned Media Using Optical Detection Integrated With The Head Structure," *IBM Technical Disclosure Bulletin* 32(11):397-399.

Yoshikawa, A. et al. (May 1995). "Laser-Dectector-Hologram Unit for Thin Optical Pick-Up Head of a CD Player," *IEEE Transactions on Components, Packaging, and Manufacturing Technology* PArt B, 18(2):245-246.

* cited by examiner

SYSTEMS AND METHOD FOR FORMING A SERVO PATTERN ON A MAGNETIC TAPE

REFERENCE TO RELATED APPLICATIONS

This application is a divisional of Ser. No. 09/361,669, filed Jul. 27, 1999, which is a CIP of earlier filed U.S. patent application Ser. No. 09/046,723, entitled "Multi-Channel Magnetic Tape System Having Optical Tracking Servo", filed 24 Mar. 1998, now abandoned and naming Joseph Panish as an inventor, the disclosure of which is incorporated by reference.

FIELD OF THE INVENTION

The invention relates to systems and methods for manufacturing recording tape, and more specifically, to systems and methods for formatting a recording tape with servo tracks.

BACKGROUND OF THE INVENTION

Digital tape recording remains a viable solution for storage of massive amounts of data. Conventionally, at least two approaches are employed for recording digital information onto magnetic recording tape. One approach calls for moving the tape past a rotating head structure which records and plays back user information from discontinuous transverse tracks. Interactive servo systems are employed to synchronize rotation of the head structure with travel of the tape. Another approach is to draw the tape across a non-rotating head at a considerable linear velocity. This approach is sometimes referred to as linear "streaming" tape recording and playback.

Increased data storage capacity and retrieval performance is being required of all commercially viable mass storage devices and media. In the case of linear tape recording, a popular trend is toward multi-head, multi-channel fixed head structures with narrowed recording gaps and track widths. Such narrow recording heads allow many linear tracks to be formed on a tape medium of predetermined width, such as one-half inch width tape. Tape substrates are also being made thinner, with increased tape lengths being made possible in small diameter reel packages.

Because of a relatively high linear tape velocity and because tape substrates continue to be made thinner and thinner, guiding tape past a tape head structure along an accurate invariant linear path has proven to be highly problematical. One error phenomena is known as "lateral tape motion" or "LTM." LTM is a major source of tracking errors in linear tape recording. One proposed approach to minimizing LTM tracking errors includes printing servo tracks onto the tape, to allow a control system to maintain fine control over the alignment between the recording head and data tracks associated with the servo tracks. Such a system is described in the above identified U.S. patent application "Multi-Channel Magnetic Tape System Having Optimal Tracking Servo."

As described therein, a system can compensate for lateral tape movement by employing a servo mechanism to record data onto a magnetic tape that is preformatted with a suitable servo pattern. Such pre-formatting allows a user to insert a tape into an existing tape drive and immediately begin recording data without having to first format the tape, thus avoiding what can be a time consuming process. Thus, preformatted tapes can hold more data and save time for a user. However, the success of the system depends in part on the ability to accurately format a tape with a set of servo tracks.

Thus, there is a need in the act for systems that can accurately and efficiently format a magnetic tape with one or more servo tracks.

SUMMARY OF THE INVENTION

The systems, methods and products of the invention include systems and methods for manufacturing servo tracks on a magnetic tape. In one aspect, the invention includes systems for manufacturing magnetic tapes having servo tracks thereon wherein the servo tracks are optically detectable and are capable of being processed by a servo control system for maintaining alignment of a magnetic recording head with the data tracks on the recording side of the magnetic tape. In one practice, the manufacturing systems described herein engrave the servo tracks onto the non-recording side of a magnetic tape by directing a laser beam at the non-recording side of the magnetic tape. In another practice, the manufacturing systems described herein engrave the servo tracks onto the magnetic side of a magnetic tape by directing a laser beam at the magnetic side of the magnetic tape. Such engraved patterns can act as optical servo tracks for maintaining alignment of the recording head with the data tracks on the magnetic tape.

In alternative processes, a servo track can be printed onto the tape by operation of an ink jet printer that delivers onto the surface of the magnetic tape a material capable of leaving an optically detectable mark on the tape. In still other practices, a servo track can be embossed onto the magnetic tape to provide the servo track.

In general, the systems and methods described herein engrave multiple servo tracks onto a magnetic tape to provide alignment information for a plurality of data tracks. The tracks can be grouped into a plurality of bands, with the bands extending across the width of the tape. For example, in one practice the methods described herein are applied to generate a magnetic tape with four bands, each band including seventeen servo tracks to provide sixty-eight servo tracks in all.

BRIEF DESCRIPTION OF THE DRAWINGS

The foregoing and other objects and advantages of the invention will be appreciated more fully from the following further description thereof, with reference to the accompanying drawings wherein.

DETAILED DESCRIPTION OF THE ILLUSTRATED EMBODIMENTS

To provide an overall understanding of the invention, certain illustrative embodiments will now be described, including a system for marking a servo pattern onto a magnetic tape. In one particular illustrative embodiment, a laser is employed for engraving the non-recording surface of a magnetic tape with a plurality of servo tracks, each of which can be employed for aligning a recording head to a data track also recorded onto the magnetic tape. However, it will be understood by those of ordinary skill in the art that the manufacturing methods and systems described herein can be adapted and modified to provide alternative systems and methods each suitable for marking servo tracks onto the magnetic tape, and each deemed to be within the scope of the invention.

Figure 1:
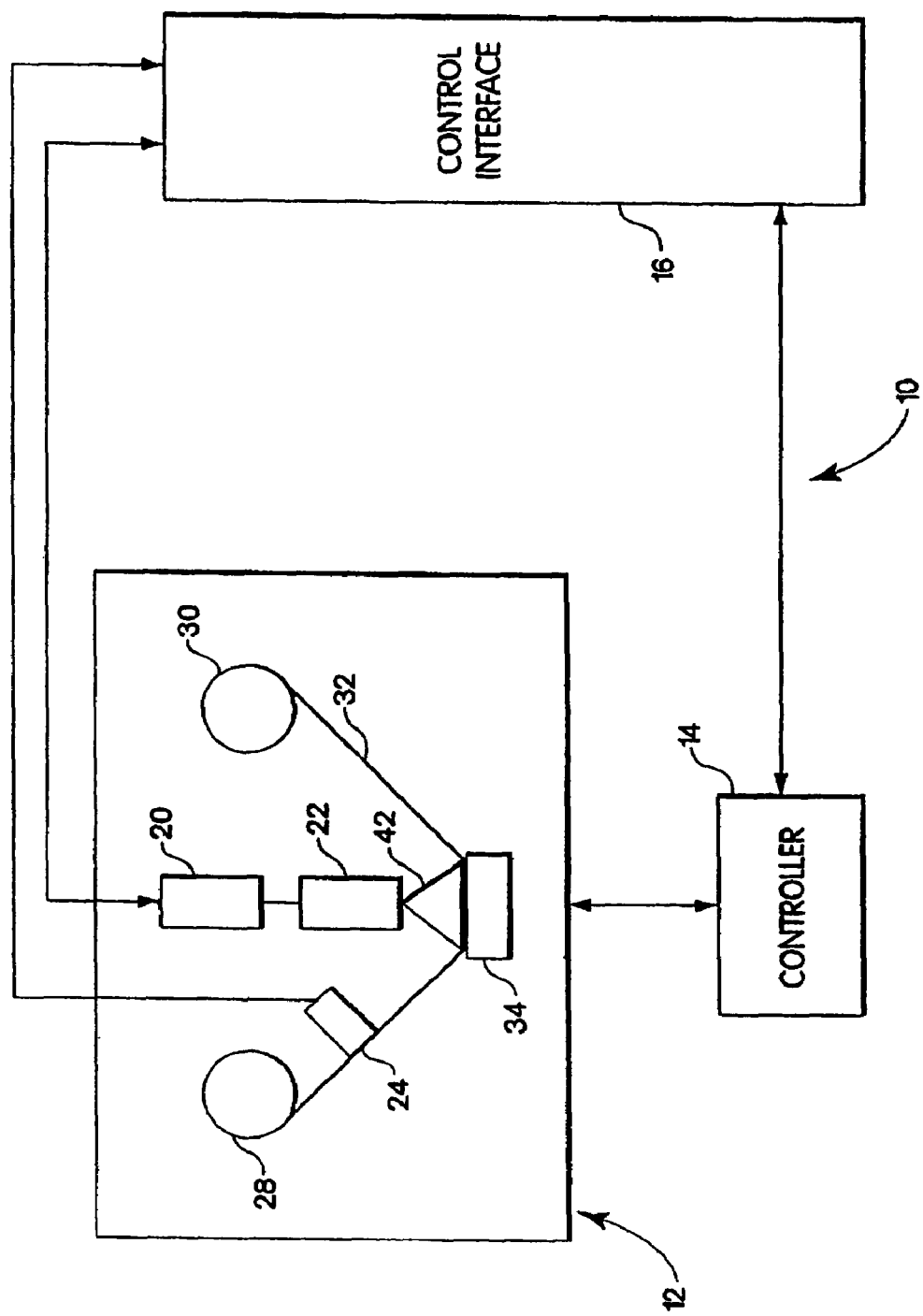
FIG. 1 depicts a function block diagram of one system for manufacturing a tape that has servo tracks thereon.

FIG. 1 shows a functional block diagram of one embodiment of a system for forming servos tracks on the magnetic tape. Specifically FIG. 1 depicts a system 10 that employs an optical engraving system to mark a servo tack onto a surface of a magnetic tape. Block 12 is the marking unit that includes the optical marking engine, blocks 20 and 22, and the tape transport whose path 32 is defined by the two spools, 30 and 34, and the tape stabilizer 34, which minimizes tape movement at the beam marking area. A multiplicity of beams formed by the marking optics is depicted as the triangle 42. Block 24 is a verifier, which is located downstream from the marking area, and carries out the function of direct read after write, thus verifying that marks engraved onto the tape surface are appropriately written. Block 14 can be a computer in which resides the software that controls the transport control device, the marking laser, and the verifier, some or all of which can be mediated via the I/O interface 16. One feature of the depicted verifier 24 is that the direct read after write signals can be conditioned and processed via a digital signal processor which establishes pass/fail criteria for various features of interest. Thus the marking engine either can be de-activated under the most severe offense for which correction on the fly is not feasible or, for a milder offense that can be corrected on the fly, the failed portion of the tape can be identified and its location recorded in the computer. The failed portion of the tape can be discarded during a subsequent process.

Figure 2:
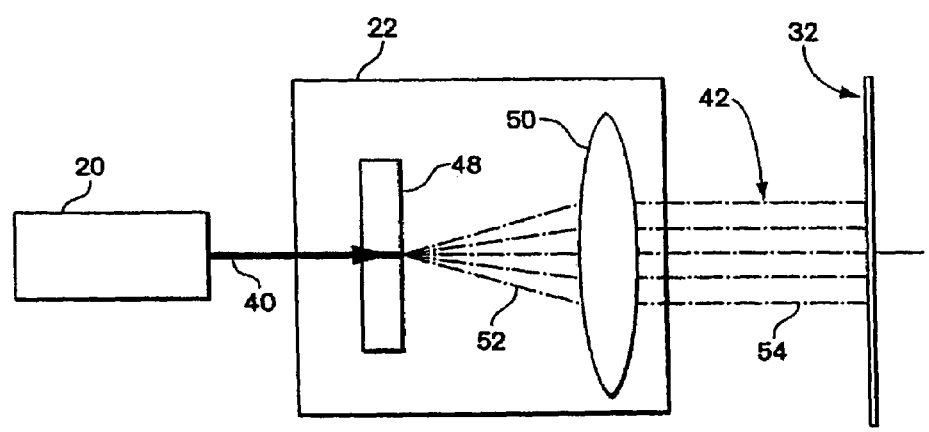
FIG. 2 depicts in more detail an optical engraving mechanism suitable for use with the system of FIG. 1 for marking a servo pattern onto a magnetic tape.

Turning to FIG. 2, one optical marking engine for marking servo tracks on the magnetic tape is shown in greater detail. Specifically, FIG. 2 depicts a laser 20, and optics 22 that include a first optical element 48 and a second optical element 50. FIG. 2 further depicts that the beam 42 projected from the optics 22 comprises a plurality of smaller beams, each of which is focused on the tape 32 for marking a servo track thereon.

The embodiment depicted in FIG. 2 includes a laser 20 that can be a continuous wave laser or a pulse laser. The laser 20 can operate at any suitable wavelength, or range of wavelengths, and in one particular embodiment is a laser operating in the infrared spectrum.

The laser 20 generates a beam 40 that can be directed into the optics 22. The optics 22 can condition the beam 40 to have certain selected characteristics such as power and pointing characteristics that are suited to the particular application. In the embodiment of FIG. 2, the optics 22 include a diffractive optical element (DOE) 48 that splits the high power coherent collimated beam 40 generated by laser 20 into multiple beams 52, each substantially of equal power and each diverging from the optical axis upon which the beams 40 traveled. To focus the divergent beams, the optics 22 include a lens element 50. The lens 50 can be as simple as a conventional plano-convex lens with a selected focal length or more complex such as a scanning lens, or an 10 lens, depending on the resolution and field size required. The optics 22 can focus the divergent beams 52 to generate the depicted beam pattern 42. The lens 50 acts to focus the individual beams 54 that comprise the beam pattern 42 so that each beam 54 focuses onto the surface of the magnetic tape 32. The multiple beams 42 generate an array of marks on the tape simultaneously. In one embodiment, the laser 20 operates continuously and therefore the servo tracks formed by the array of beams 42 include a plurality of continuous tracks engraved into the surface of the magnetic tape 32. In an alternative embodiment, the laser 20 can be a pulsed laser that can provide intermittent beam operations at selected frequencies, and which is capable of intermittently marking the surface of the media 42. In this embodiment, the servo track is comprised of a series of marks, with each mark being spaced from adjacent marks.

As can be seen from a review of FIG. 2, the beams 52 diverge from the optical axis of the beam 40 after passing through the diffractive optical element (DOE) 48. The angle of divergence of the multiple beams 52 from this optical axis turns in part on the characteristics of the DOE 48. Typically, a DOE is a planar element that consists of zones which retard the incident wave by a modulation of the refractive index or by a modulation of the surface profile. The light emitted from the different zones interferes and forms the desired wave front. One specific type of DOE is the Fourier array generator or fan-out DOE which splits an incident laser beam into multiple beams or an array of beams with substantially equal intensity and angular separation. In one such particular embodiment, the DOE can be a phase-only element, having multi-level micro reliefs ("binary optics") or continuous micro reliefs with features ranging from submicron to millimeter dimensions and relief amplitudes of submicrons to microns depending on the wavelength of interest.

As the laser beam 40 is incidents on the DOE, multiple beams 52 are generated. The divergence angles of the output beams 52 are determined by $$A \sin \theta_n = n\lambda \quad (1)$$
$$\theta_n = n\lambda/A \text{ for } \theta_n))1 \quad (1a)$$

where $\Delta$ is the basic grating spacial period, $\lambda$ is the wave length, and n is the diffraction order: $n=0, \pm 1, \pm 2, \ldots$ $\pm(N-1)/2$ for an odd (N) numbered DOE and $n=\pm 1, \pm 3, \ldots \pm(N-1)$ for an even (N) numbered DOE. Since the grating period can be precisely controlled within the submicron range in a fabrication process similar to a typical wafer process, high accuracy in the divergence angle can be achieved.

The efficiency and uniformity of the desired output beam are parameters that can be optimized by controlling the fine feature and profile within the repeated grating period. With known design algorithms and known submicron fabrication techniques, such as e- beam masking, it is understood that one may achieve an efficiency of 75–85% and uniformity within 5%.

The plurality of beams 54 are projected from the lens 50 and focused on the tape 32. The lens 50 focuses the beams 54 onto the tape media, and the laser provides sufficient power to engrave simultaneously an array of marks onto the tape 32. The mark position on the tape 32 can be determined by $S_n = f \tan(\theta_n)$
$S_n = f\theta_n = nf\lambda/\Delta$ for $\theta_{n<<}1$ It will be apparent to those of ordinary skill in the art that many different patterns can be employed for forming a suitable servo track onto the magnetic tape. The actual servo track marked onto the magnetic tape can vary depending upon the characteristics of the particular application at hand. To achieve these different servo track patterns, the marking mechanisms employed can be selected to mark the magnetic tape in a way that forms the desired servo track pattern. For example, marking mechanisms that employ laser engraving, such as the marking mechanism depicted in FIG. 1, can employ different optical assemblies to form the particular beam pattern that will mark the tape with the servo track pattern of interest.

Figure 3:
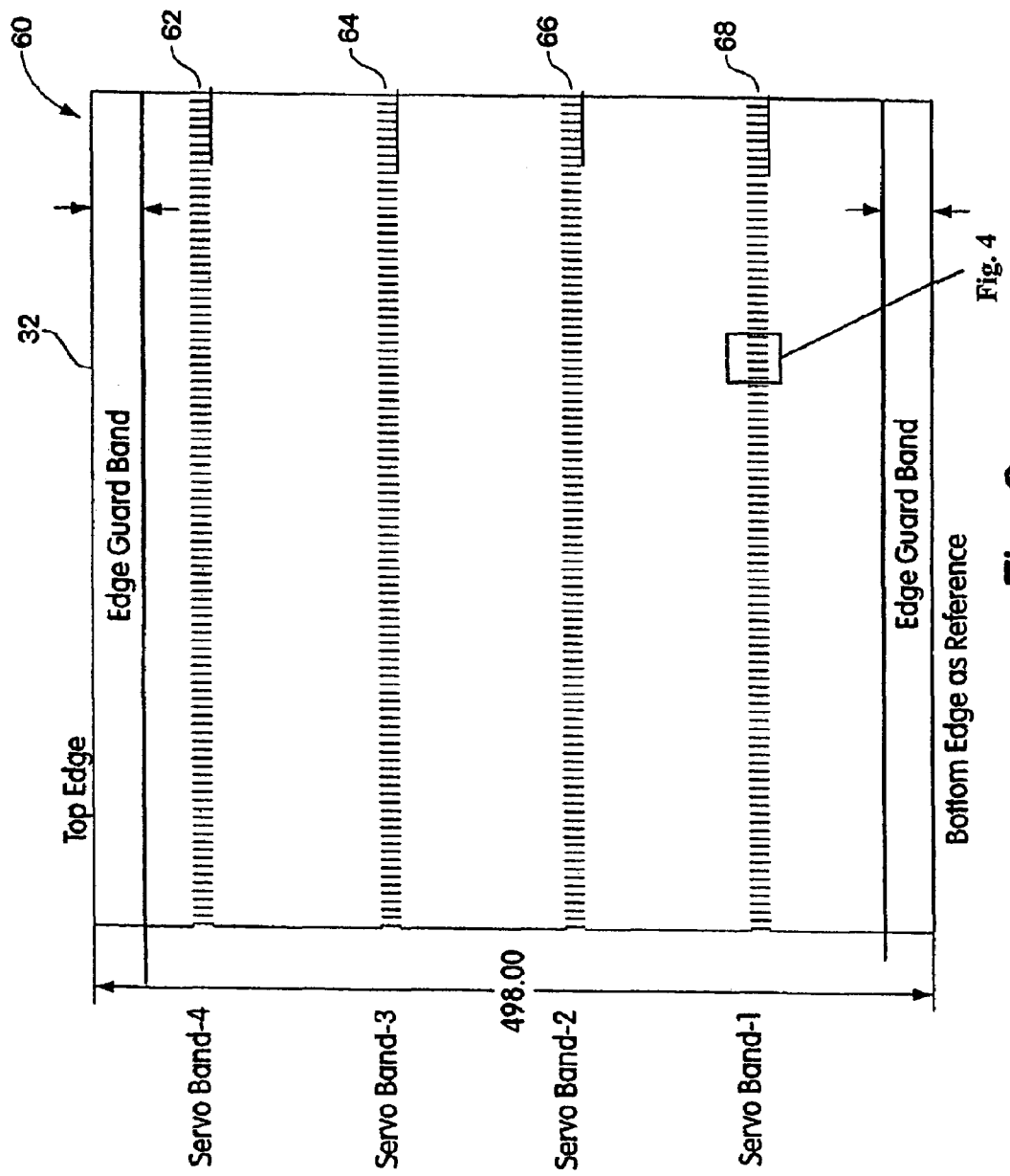
FIG. 3 depicts one pattern for a servo track that can be formed on a tape by employing a system such as that depicted in FIG. 1.
Figure 4:
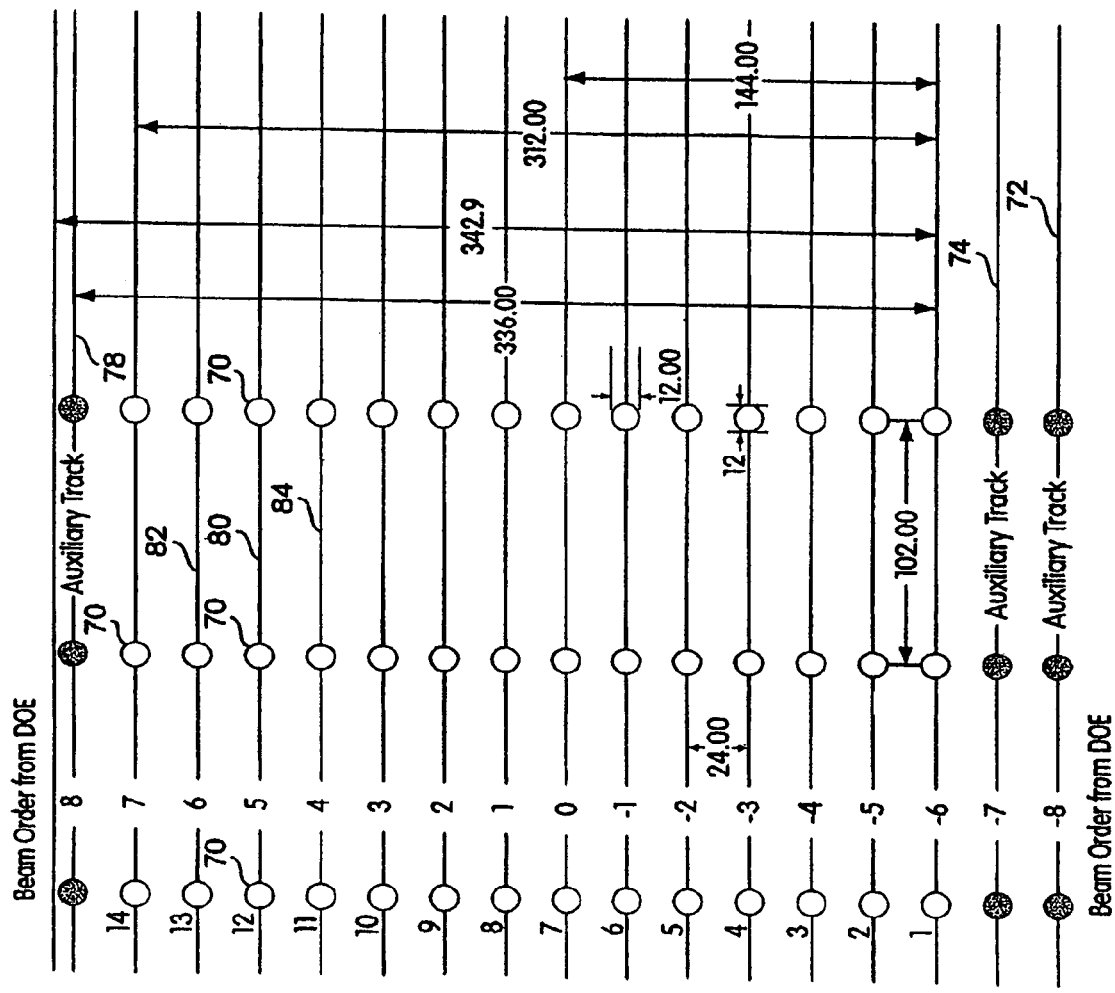
FIG. 4 depicts in greater detail the servo track depicted in FIG. 3.

One example of the type of servo track pattern that can be formed by the systems and methods described herein is depicted in FIGS. 3 and 4. Turning to FIG. 3, one servo track pattern 60 is depicted on a surface of a tape 32, wherein the servo track pattern 60 comprises a series of servo bands 62, 64, 66 and 68. Each of the servo bands 62 through 68 extends longitudinally along the length of the tape 32. Each individual band is spaced away from its respective adjacent bands, or the edge of the tape 32. Each servo band 62 through 68 can correspond to one or more data tracks that can be located on the corresponding section of the recording side of the magnetic tape 32. Each band 62 through 68 can comprise a plurality of servo tracks. This is shown in more detail in FIG. 4.

Specifically, FIG. 4 depicts in detail one servo band, such as, for example, servo band 62, that can comprise a plurality of servo tracks, each servo track being formed by a plurality of marks 70 that can be engraved onto the magnetic tape 32 by a marking mechanism, such as a marking mechanism 12 depicted in FIG. 1. As further shown by FIG. 4, the servo band 62 comprises seventeen tracks formed of intermittent marks 70. Fourteen of the tracks can be employed as servo tracks that correspond to data tracks on the corresponding recording side of the magnetic tape 32. Two auxiliary tracks 72 and 74 can be located at the lower portion of the servo band 62, and an auxiliary track 78 can be located at the upper edge of the servo band 62. Data tracks can carry data and auxiliary tracks can carry control information as well as delimit the edges of the band or tape. Each track, such as for example a data track 80, comprises a plurality of marks 70, which are spaced apart a uniform distance. In the embodiment depicted in FIG. 4, each mark is spaced apart along the tape at about 100 micrometers. Each mark is approximately 12 micrometers in diameter and the marks of each track, such as the marks 70 of track 80 are spaced approximately 24 micrometers away from the corresponding marks 70 of the adjacent servo tracks, such as servo tracks 82 and 84. The servo tracks depicted in FIG. 4 extend the full length of the magnetic tape. The systems and methods described herein manufacture tape by marking the magnetic tape with the marks, such as the marks 70 depicted in FIG. 4, to provide optically detectable servo tracks. These servo tracks can be employed for aligning recording heads with a data track recorded onto the opposite side of the magnetic tape. The servo tracks, which in FIG. 4 are spaced micrometers apart, provide for precise alignment of a recording head with a data track regardless of the tape lateral motion. Thus more data tracks can be provided on the magnetic tape, thereby increasing total storage capacity for a magnetic tape. The number of servo tracks that are marked onto a magnetic tape depends, in part, on the size of the mark, the pitch between marks, and the pitch between servo tracks. To control these characteristics, the systems and methods described herein provide for marking mechanisms that can adjust the spatial characteristics of the patterns generated by the marking mechanisms that form the servo tracks.

Figure 5:
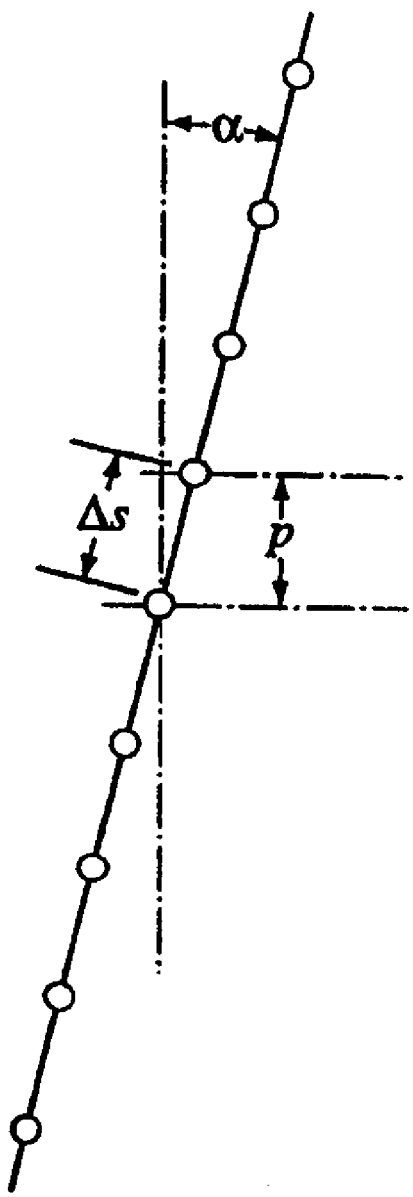
FIG. 5 depicts one practice for adjusting the pitch between marks in a servo track.

Turning now turn to FIG. 5, it is shown that the depicted marking mechanism 12 of FIG. 2 can include a track pitch adjustment mechanism that can adjust the spatial characteristics of the patterns being generated. In one practice, the relative pitch, p, between servo tracks can be determined according to the following relationship, $p = \Delta s \cos \alpha$ where $\Delta s$ is the track pitch at a equal zero degree, and $\Delta s$ is dictated by the DOE parameters and the focal length of lens, shown 50 in FIG. 2.

The track pitch, p, which is representative of the spacing between different servo tracks on the tape 32, can be adjusted via the angle $\alpha$ by rotating the DOE 48. To this end, the DOE 48 can be mounted on a gimbal, or pivot that allows the DOE 48 to be rotated in a clockwise or counterclockwise direction. The gimbal or pivot can be motorized with a stepper or DC motor and an encoder and gear box assembly providing sufficient fine level control over the angle of the DOE 48 relative to the optical axis of the beam 40. As will be described below, the motor assembly can be part of a closed loop control system that continuously monitors and adjusts the pitch between servo tracks engraved onto the tape 32.

Figure 6:
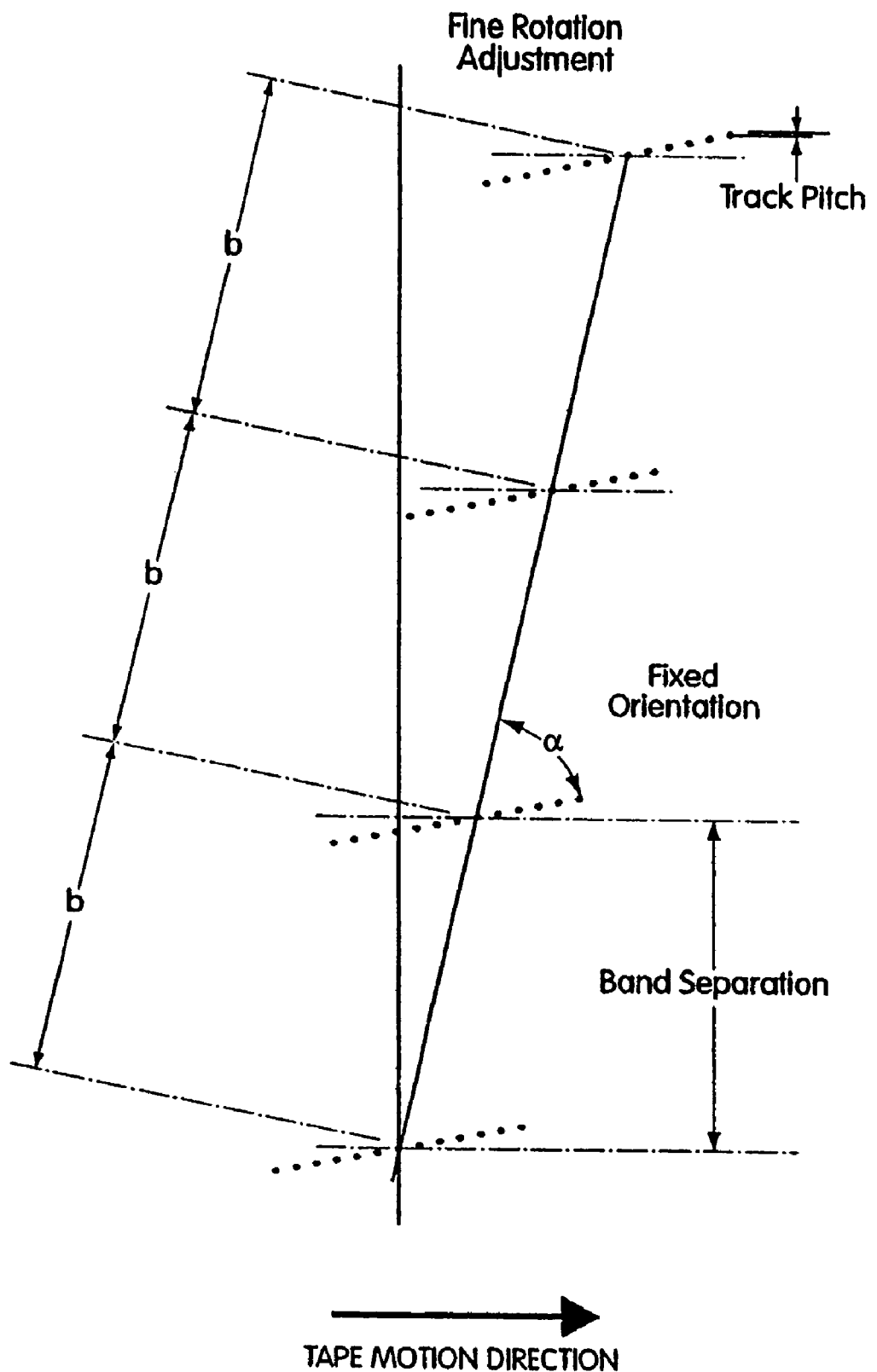
FIG. 6 depicts a further practice for adjusting the pitch between marks in a servo track, and between different bands of servo tracks on a magnetic tape.

In a further embodiment, wherein the servo tracks being engraved onto the tape 32 include a plurality of bands, such as depicted in FIG. 3, the marking mechanism 12 can include a mechanism for spatially separating or controlling the spatial separation of the bands as well as the spatial separation of the individual tracks. Within a servo band, the multiple servo tracks have a track pitch of microns to tens of microns. The separation between the servo bands is larger, on the order of millimeters. To generate such a pattern, the marking mechanism 12 may, in one embodiment, employ two DOEs with different divergence angles: one corresponding to track pitch and the other corresponding to the band separation. As shown in FIG. 6, this embodiment can allow rotation of each DOE independently, thereby allowing the control of the pitch between servo tracks and bands of servo tracks. Similar to the DOE controlling the track pitch described above, this DOE controlling the band separation can be mounted on a gimbal or pivot that can be motorized to allow for control of the incidence angle, of light passing through the first DOE and entering the second DOE. Both the first and second DOEs can be part of a control mechanism that allows for monitoring and controlling the relative spatial characteristics of the pitch between servo tracks and pitch between bands of servo tracks. In further embodiment, a two dimensional DOE can be designed with specified relative orientations that will work with a single fine rotational adjustment. Such an embodiment is well suited to an application wherein the beam fan-out that is associated with or that corresponds to the band separation is more or less perpendicular to the tape motion, while the beam fan-out corresponding to the track separation is at a relatively small angle with respect to the tape motion.

Figure 7:
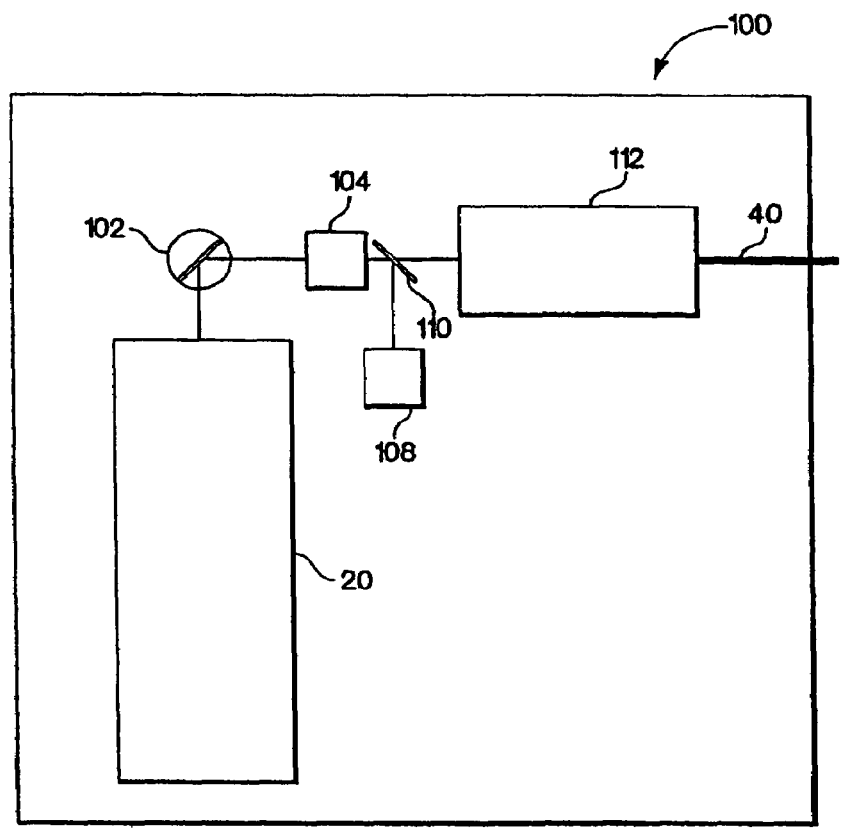
FIG. 7 depicts beam forming optics suitable of use with the optical marking mechanism shown in FIG. 2.

The optical marking mechanism depicted in FIG. 2 consists of the beam forming mechanism 20 and the pattern generator 22. One suitable beam forming device is depicted in FIG. 7. The beam forming device 100 depicted in FIG. 7 can process a beam of light to have the desired power, size and pointing stability. To this end, the beam forming device 100 can include the laser 20 that generates a beam of light that, if incident on a mirror 102, the mirror 102 can reflect the beam of light to an attenuator 104. The attenuator 104 can adjust the power level of the beam to achieve a desired power setting. The beam passing through the attenuator 104 can be split by the beam splitter 110 that passes a substantial portion of the beam power through to a beam expander 110 and directs a smaller portion of the beam to a detector 108. The detector 108 can monitor the power, position and pointing of the beam. A closed loop control system for the power and pointing characteristics can be applied, optionally, for adjusting these characteristic and thereby controlling characteristic of the marks being generated on the tape 32. For example, controlling the power of the beam can impact on the size and depth of marks engraved into the surface of the tape 32.

The depicted beam attenuator 104 can be a zero order half wave retarder and a glanz laser polarizer of polarizing beam splitter cube. Additionally, the beam attenuator 104 can be a neutral density filter. However, any suitable optical element for adjusting the power of the beam can be employed without departing from the scope hereof. The beam splitter can be a polarizing beam splitter cube or any other suitable element. The mirror can be an actuator that comprises a pizeoelectric stage that is mechanically connected to the mirror to adjust the angle of reflectance therefrom. The pizeoelectric system can couple to a closed loop control system that comprises a servo control mechanism that can adjust the orientation of the mirror for varying the beam pointing in response to the position error signal from the detector 108. The detector 108 can be quardrature detector that is capable of detecting the pointing error and power variation within a beam. The depicted optical elements can be any suitable elements capable of performing the functions described herein, and can include commercially available components such as those sold by the Melles Criot Company. Other elements can be employed with the beam forming device 100 without departing from the scope of the invention.

Figure 8:
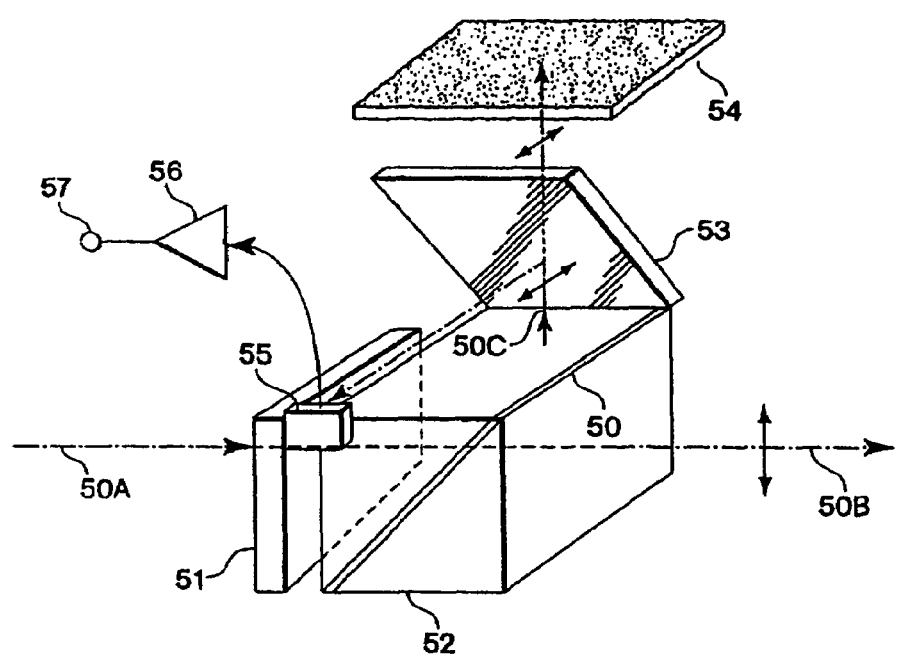
FIG. 8 depicts one device in which the functions of optical power attenuation and power monitoring in the beam former described in FIG. 7 are combined.

An embodiment where the optical attenuator and the optical power monitor are combined is shown in FIG. 8. 50A represents the incident optical beam. Element 50 is a half wave plate, which will rotate polarization angle of the incident beam. Element 52 is a polarizing beam splitter dividing the beam into 50B and 50C, whereby the intensity ratio of 50B and 50C is entirely determined by the polarization angle of the beam incident on this polarizing cube. Thus, the outgoing beam can be attenuated to any amount with this device. A portion of the unused beam 50C is allowed to pass through a optical window 53 tilted at 45 degree and consequently dissipated by a roughened metallic plate 54 such as a coarse aluminum plate. Another portion is reflected by window 53 to reach a detector 55, and consequently amplified and conditioned by 56 to produce an electronic signal 57 proportional to the power level on the detector. When the optical power level out of the laser beam 50A is varied due to the unavoidable aging of the laser or other reasons, the power variation is sensed by the detector 55. The corresponding signal 57 can be injected into a control loop to adjust the laser power such that 50A remains substantially the same which also makes the output power 50B substantially the same.

Figure 9:
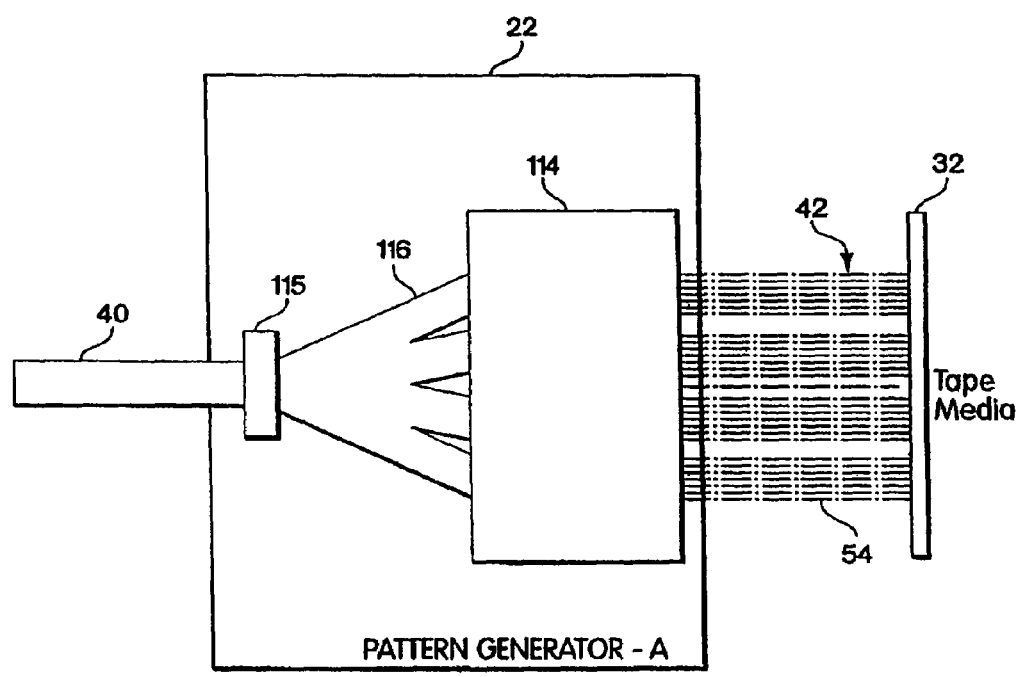
FIG. 9 depicts one pattern generator suitable for use with the optical marking mechanism of FIG. 2, in which angularly separated beams corresponding to the bands and the tracks within a band are both formed by diffractive optical elements and simultaneously focused on the tape.

Turning to FIG. 9, one embodiment of a pattern generator capable of processing a beam provided by the system of FIG. 7. The pattern generator depicted in FIG. 9 receives an incoming beam 40, which is then split by the DOE 115 to form N multiple bands of beams 116. Each band also can contain M multiple beams 54 thereby providing an N×M matrix of beams each having substantially equal power and profile. The DOE 115 can be a one piece 2-D Fourier array generator, or two 1-Fourier array generators placed in series as described earlier. The lens 114 can project and focus the beams onto the magnetic tape 32. The power or energy of each focused beam is such that some of the tape surface will be ablated, thereby forming marks that make the optically detectable servo tracks on the magnetic tape 32. As the tape 32 moves along the tape path, N bands of servo tracks, each band containing M servo tracks, can be engraved onto the surface of the tape 32.

Figure 10:
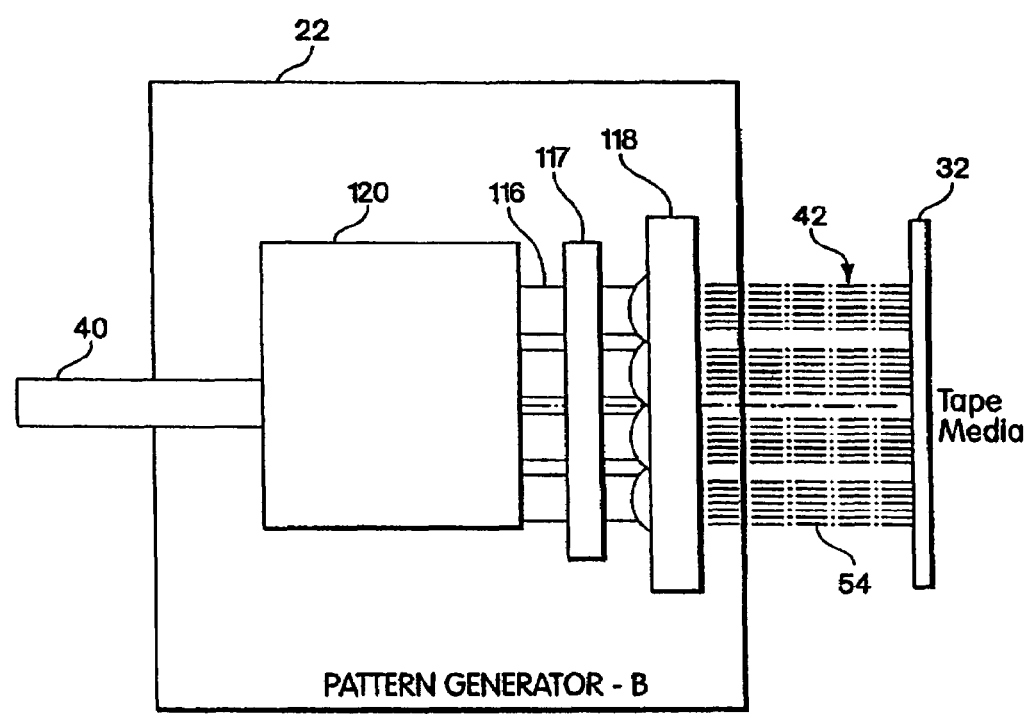
FIG. 10 depicts an alternative embodiment of a pattern generator that employs a segmented mirror to generate a plurality of parallel beams, followed by a diffractive optical element to generate the tracks within each band, and further followed by a lens array to focus the beams onto the tape.

Turning to FIG. 10, a further alternative embodiment of a pattern generator is depicted. In this embodiment, a number of parallel beams corresponding to the number of bands are generated by a segmented mirror 120, such as the segmented mirror depicted in detail in FIGS. 11 and 12, and the servo tracks within the bands are generated by a DOE 117. The multiple beams are simultaneously focused on the tape via an array of lenslets 118. Another embodiment can consist of a segmented mirror in series with a double refractive crystal, such as quartz or Calcite, see FIG. 13. The beam separator 120 splits the incoming beam into multiple (N) parallel beams with substantially equal power. A DOE 117 then spilt each of the (N) beams into a band of M beams of substantially equal power and angular separation. The N band of beams can be projected and focused by the depicted lense array 118 that comprises N lenses, one lens for each band that has been generated. The plurality of beams 54 are projected from the lens 50 and focused on the tape 32. The lens array 118 focuses each beam of light onto the surface of the tape 32 to ablate a portion of the tape and thereby form an optically detectable servo track thereon.

Figure 11:
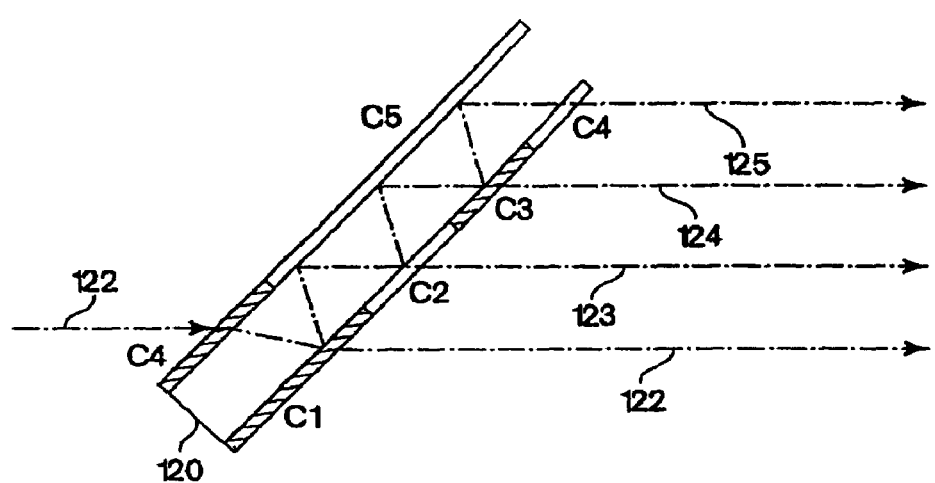
FIG. 11 depicts the use of a segmented minor tilted at about 45 degrees to create a number of parallel beams corresponding to the number of bands depicted in FIG. 9.

Turning to FIG. 11 one suitable beam separator, a segmented mirror, 120 is depicted in detail. Specifically, FIG. 11 depicts an incoming beam 121 that is directed to a segmented mirror beam separator 120, which creates a plurality of beams 122 through 125. The segmented mirror 120 provides an optical flat coated with a pre-determined reflectivity, C1 through C5, at each of the appropriate segment is tilted at 450° to the incident beam, 121. N parallel beams, 122 through 125, are generated upon successive bounces off the exit surface with an intensity of 1/Nth of the incident beam. One example of a design for the segmented mirror 120 is depicted in FIGS. 12A and 12B, where the reflectivity A through E for a four beam generator are 0.75, 0.667 0.5, 0, and 1 respectively.

Figure 12A:
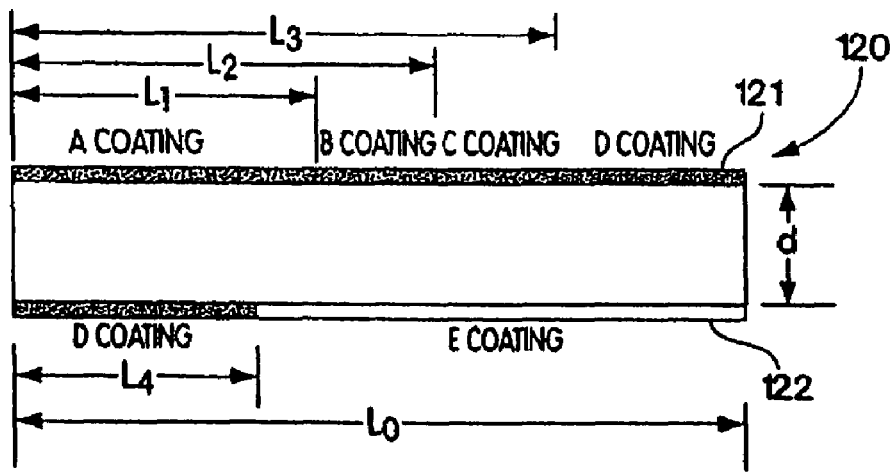
FIG. 12 depicts one segmented mirror for creating the parallel beams depicted in FIG. 9.
Figure 12B:
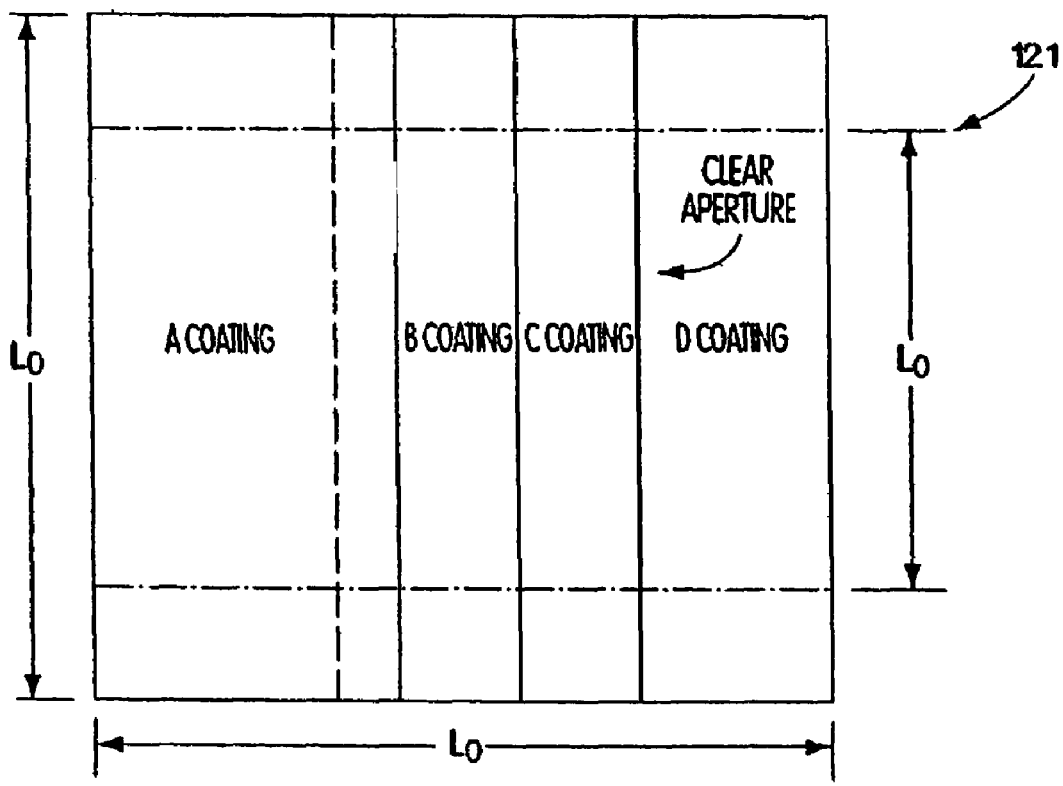

FIG. 12A presents a side view of the segmented mirror 120. More particularly, the FIG. 12A depicts that the segmented mirror 120 can include a first surface 121 and a second surface 122. The two surfaces can be spaced apart about 3.6 mm, and are parallel to each other to about 1 minute. In one particular example, the segmented mirror 120 can have a length $L_o$ of about 23.7 mm. FIG. 12B shows in more detail the relative spacing of the segments of the coated surface 121. Specifically, FIG. 12B shows that the surface 121 can be segmented into separate coated sections each having a coating of selected reflectivity. In FIG. 12B the distance to the edge of each coated segment is given as about 9.88 nm, 13.83 nm, and 17.78 nm, for $L_1$ $L_2$, and $L_3$ respectively. On surface 122, as shown in FIG. 12A, a similar segment, having a coating D, can be formed that extends about 7.9 mm into the mirror, with a further segment, with coating E, extending for the rest of the length of the mirror. The substrate for the depicted segmented mirror 120 can be fused quartz, with a surface quality 20-10 scratch dig and flatness of about on fifth the wavelength for around about 532 nm.

Figure 13:
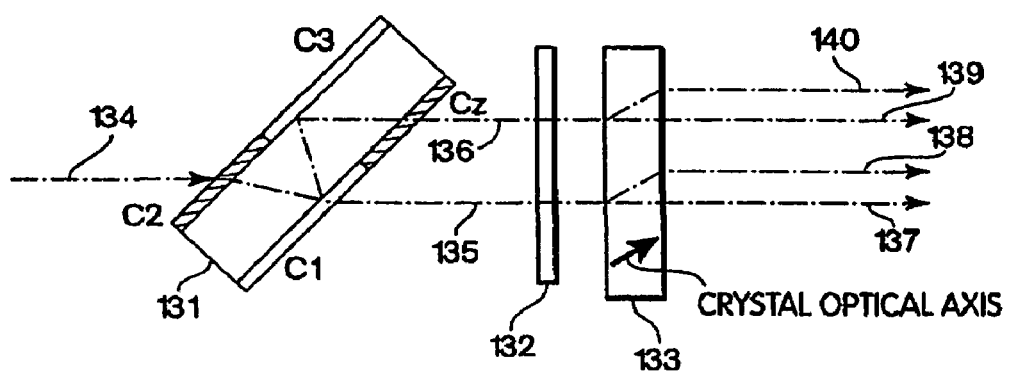
FIG. 13 depicts yet another method of creating a number of parallel beams using a two-beam segmented mirror in tandem with an optical birefringent plate.

Turning now to FIG. 13, there is shown yet another method of generating multiple parallel beams. Here a segmented mirror 131, producing only two parallel beams is employed, followed by a double refractive crystal 133, whereby each incident beam is split into two beams of equal intensity, thus producing a total of four beams. The purpose of the half wave plate 132 is to control the polarization of the beams such that it is at a correct angle with respect to the double refractive plate 133. It should be noted that the 2-beam segmented mirror can be replaced by a double refractive crystal to achieve the same purpose. Such a format can be cascaded to produce a total of $2^n$ beams, where n is an integer. It will be noted that a two-beam segmented mirror and/or a double refractive crystal is typically simpler to manufacture than a higher order segmented mirror. The combined cost is typically less than a single higher order segmented mirror.

Returning now to FIG. 1, it can be seen that the tape 32 travels through a work area wherein a stabilizer element 34 is disposed. The stabilizer element 34 serves two purposes. One is to reduce the tape flutter that can occur as the tape moves through the work area. In the embodiment depicted in FIG. 1 the marking mechanism 12 employs an optical engraving system that focuses a beam, or beams of light onto the surface of the magnetic tape to improve the accuracy and uniformity of mark sizes formed on the magnetic tape The stabilizer reduces the flutter of the tape 32 thereby maintaining the tape 32 within the focal plan of the light employed for engraving the tape. Another purpose of the stabilizer is to reduce the LTM of the tape frequently mentioned in the earlier paragraphs. Such LTMs, if left uncontrolled, will produce in-band resonance in the servo loop, causing poor tracking performance. Any suitable system for stabilizing the magnetic tape 32 as it passes through the work area can be employed by the systems described herein without departing from the scope of the invention.

Figure 14:
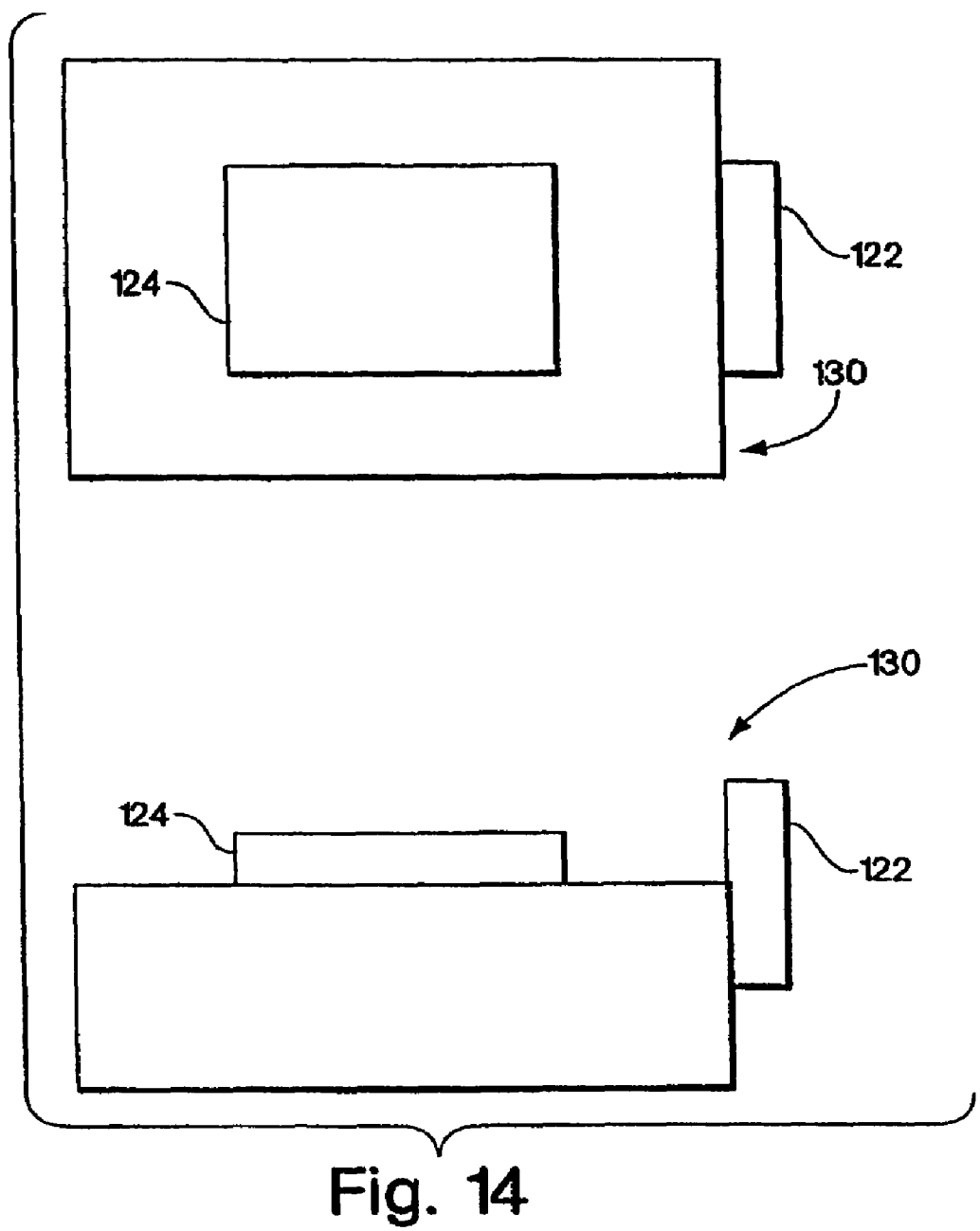
FIG. 14 depicts one suitable stabilizer for minimizing tape flutter and tape lateral motion.

One particular embodiment of a stabilizer 34 that can be employed with the systems described herein includes the stabilizer 130 depicted in FIGS. 14A&B. The depicted stabilizer 130 provides a flat surface that can be disposed adjacent to one side of the magnetic tape 32 as the magnetic tape 32 passes through the work area. The stabilizer 130 acts to hold the magnetic tape 32 down against its flat surface 124. As the tape moves across that surface it is understood that a vacuum effect is achieved wherein a pressure differential occurs that acts to draw the magnetic tape against the flat surface 124 reducing the likelihood that the magnetic tape 32 will lift off the stabilizer 130 and move out of the focal plain of the beams 42. The particular stabilizer 130 depicted in FIGS. 14A and 14B approximately the width of the tape, which can be for example one half inch. The stabilizer 130 can have a flat surface formed of a ceramic material. Optionally a lateral bar, depicted as the member 122, can be disposed at one edge of the stabilizer to provide a surface that can butt against the edge of the tape 32. This bar 122 reduces lateral tape movement and allows the servo track pattern to be more accurately positioned on the surface of the tape 32. Optionally, a second bar can be disposed opposite the depicted bar 122 to reduce lateral tape movement in both directions.

The marking mechanism 12 further includes a verifier 24. Specifically, the depicted marking mechanism 12 includes a verifier 24 that is disposed proximate the tape 32 at a location wherein the tape 32 passing the verifier 24 has been marked by the marking mechanism 2. The verifier 24 can monitor characteristics of the servo track or tracks engraved upon the tape 32. For the embodiment depicted in FIG. 1 the verifier 24 is capable of monitoring a servo track that has been engraved by an optical marking mechanism onto the surface of the tape 32. However, depending upon the type of marking mechanism employed by the system, the type of verifier 24 used can vary. For servo tracks similar to those depicted in FIGS. 3 and 4, the verifier 24 can monitor characteristic representative of the size of the marks that comprise the servo tracks, the spacing between individual marks in the same servo track, the track pitch between different servo tracks, and the spacing or pitch between bands of servo tracks.

In one particular embodiment, the verifier 24 includes a optical element similar to that disclose in U.S. patent application Ser. No. 09/191,766, entitled Optical Apparatus For Tracking A Magnetic Tape, by Panish et al., and assigned to the assignee hereof, hereafter called the focalizer. As described therein, the focalizer can include a semi-conductor device capable of generating a laser beam that can be split into a plurality of separate beams and focused on the tape 32 via an lens element. The semi-conductor device can further include sensor elements capable of detecting light reflected back from the tape 32. This focalizer would be mounted on a motor driven shaft to move at a constant speed back and forth across the moving tape. In so doing, as marks are being written by the optical marking engine, two tracking S-curves would be obtained for each round trip across the tape width, for each of the focused beams on the tape. By measuring the amplitude of the S-curve, one can determine if the marks have the correct size and depth, and by measuring the periodicity one can determine the track pitch of the servo tracks. It can also readily measure the distances between the bands and the distance between the tape edge and the first track. Furthermore one can also subtract the two first order S-curves to obtain a push pull S-curve which is often used for tracking along a given track. All of the above data can be compared against the specifications to determine the quality of the tape and to generate a pass/fail criteria.

Turning again to FIG. 1, a further element of the system 10 is depicted that provides for moving the tape 32 from the pancake spool 30 to the take up reel 28. Specifically, FIG. 1 depicts that the system 10 can include a transport control mechanism 14 that couples between the marking mechanism 12 and the I/O control interface 16. The transport control mechanism 14 can be a control system capable of controlling the movement of the tape through work area and capable of operating the motors (not shown) that turn the pancake spool 30 and take up reel 28. Optionally, the transport control mechanism 14 can control the speed at which tape moves through the work area. As can be seen from a review of FIGS. 3 and 4, it will be understood that the relative positioning of marks and particularly the separation of marks on the same servo track depends, in part, on the speed at which tape passes through the work area. Accordingly to maintain a desired mark separation, the transport control mechanism 14 can receive information from the verifier 24 that indicates the mark separations on a servo track. This information generated by the verifier 24 can be transmitted to the transport control mechanism 14 and processed thereby for determining whether the tape speed should be increased or decreased to maintain a constant mark separation or separations.

Optionally, the transport control mechanism 14 can also employ the verifier to ensure that tape is still passing through the work area 34. For example, when all the tape 32 is spooled off the pancake reel 30, the take up reel 28 will soon carry all tape and no tape will be present in front of the verifier 24. In this case, the verifier 24 can indicate that the marking of the tape 32 is complete and generate a signal for the transport control mechanism 14. In response to this signal, the transport control mechanism 14 can power down the take up reel 28 and end the marking process.

FIG. 1 further depicts an I/O control interface 16 that couples between the marking mechanism 12 and the transport control mechanism 14. As shown in FIG. 1, the control interface 16 can couple to the transport control mechanism 14 via a bi-directional data path. The transport control mechanism 14 and control interface 16 can employ the bidirectional data path to exchange data and control signals for operating the device 10. In one particular embodiment, the control interface 16 and transport control mechanism 14 communicate such that the control interface can transmit to the transport control mechanism 14 a verification signal representative of the quality or status of tape 32 being manufactured by the system 10. This quality information can be employed by the transport control mechanism 14 to adjust the operation of the marking mechanism 12, or to interrupt production of tape. For example, in one embodiment the transport control mechanism 14, in response to a verification signal indicating that tape of insufficient quality is being manufactured, can send to the I/O control interface 16 a signal representative of a command to turn the laser 20 off. Such a signal prevents the marking mechanism 12 from further engraving a servo track onto the surface of the tape 32.

To have the signals generated by the transport mechanism 14 effect operation of the marking mechanism 12, the control interface 16 couples via a bi-directional data path to the marking mechanism 12. As shown in FIG. 1 the control interface 16 can receive information from the verifier 24. The information provided by the verifier 24 can include information representative of the characteristics of the servo track being recorded onto the tape 32. Additionally, the control interface 16 can receive a laser status signal. A laser control path can be formed thereby for monitoring the status of the laser 20 as well as for controlling the operation of the laser 20, including turning the laser 20 on or off.

In an optional embodiment, the system 10 can further include a cleaner for removing debris from the surface of the tape after the tape has been marked with the servo pattern. For example, the optical marking mechanism 12 depicted in FIG. 1 employs a laser for ablating a portion of the magnetic tape surface. The ablation of the typically organic material that makes up the surface of the magnetic tape 32 results in smoke or debris that can clog or foul the tape 32 as it is later spooled onto the take up reel 28. To reduce or prevent the accumulation of debris within the spool of marked tape, the system can employ a cleaning mechanism that carries debris away from the tape. In one embodiment, the cleaner includes a two part cleaning device. A first element includes an air source that directs a flow of gas at the surface of the magnetic tape while the tape passes through the work area. This is understood to create a flow of gas that carries debris away from the tape as debris is ablated. In one particular embodiment, the air flow is generated by an air source that creates a laminar flow of gas between an air source and a vacuum source. The laminar flow of gas is carried across the surface of the magnetic tape as the tape passes through the work area. The laminar flow of gas carries debris away from the tape and into the vacuum source where it can be filtered and later properly treated. The second element that can be included in this embodiment of the cleaner can include a conventional tape cleaner wherein a cloth-like material is placed in contact with the surface of the tape as the tape moves by. The cloth-like material cleans debris from the surface of the tape, thereby reducing or eliminating the likelihood that debris will foul the tape and perhaps obscure the newly formed servo pattern, as the tape is wound onto the take up reel 28.

In a further embodiment, the marking mechanism can include a printing mechanism that allows a servo track to be printed onto the surface of a magnetic tape. In one embodiment, the printing mechanism includes an ink jet like printing cartridge capable of delivering a marking material to the surface of the magnetic tape 32. In one practice, the printing material delivered by the printing mechanism is a fluorescent material that can be optically detected under selected lighting conditions. The design and development of such printing mechanisms is well known in the art, and any suitable printing mechanism capable of delivering a marking material to the surface of a magnetic tape can be applied herewith. Alternative mechanisms for printing a servo track pattern onto the magnetic tape can also be employed. For example, an embossing mechanism can be employed for embossing a pattern onto the tape. To this end, a roller structure can be employed. The tape can be fed through the roller structure and a servo track pattern can be embossed onto the magnetic tape. In yet a further embodiment, a process for forming a servo pattern onto the magnetic tape can include a chemical process for etching, or developing, the servo tracks onto the magnetic tape. In such an embodiment, the manufacturing process can include manufacturing a magnetic tape that includes a surface that can be chemically etched, or photochemically altered, to have appear thereon a pattern representative of a servo pattern. In one practice, the magnetic tape can be developed similar to a photographic film wherein the tape, having been exposed to a light source to generate the selective pattern, is carried through a chemical bath that results in the formation of an optically detectable servo track on one surface of the magnetic tape. These and other practices can be employed with the systems and methods described herein for providing a magnetic tape having a servo track pattern thereon.

The systems and methods described above are merely illustrative of the systems, methods and products of the invention. Accordingly, it will be understood that the invention is not to be limited to the above described illustrative embodiments, but is to be interpreted in light of the claims which are to be read as broadly as possible under the law.

What is claimed is:

1. A system for producing optically detectable servo tracks on a magnetic tape having a recording side and a non-recording side, comprising:
   a reel assembly for passing the magnetic tape through a marking area, and
   a marking mechanism which includes:
      a light source emitting a first beam of optical radiation, and
      a pattern generator which splits the first beam into a plurality of spaced-apart second beams, the plurality of spaced-apart second beams spanning a plurality of the servo tracks, and
      a controller that controls an intensity of the first beam so as to provide a time- dependent sequence of the second beams,
   the time-dependent sequence of the second beams forming the optically detectable servo tracks on the non-recording side of the magnetic tape as the tape passes through the marking area.

2. The system according to claim 1, wherein the light source includes a laser.

3. The system according to claim 2, wherein the laser comprises a pulsed laser.

4. The system according to claim 2, wherein the laser comprises a continuous wave laser.

5. The system according to claim 1, wherein the pattern generator includes an attenuator capable of attenuating the intensity of at least one of the first beam and the second beams.

6. The system according to claim 1, wherein the pattern generator includes means for controlling a pointing characteristic of at least one of the first beam and the second beam.

7. The system according to claim 1, wherein the pattern generator includes a control system for providing a closed-loop control of a characteristic representative of the power of the first beam.

8. The system according to claim 1, wherein the pattern generator includes a control system for providing closed-loop control over a characteristic representative of the pointing of the first beam.

9. The system according to claim 1, wherein the marking mechanism further includes a beam expander that expands and collimates the first beam.

10. The system according to claim 1, wherein the pattern generator includes
   a diffractive optical element comprising a one-dimensional Fourier array element having a continuous phase profile for splitting the first beam into the second beams.

11. The system according to claim 1, wherein the pattern generator includes
   a first diffractive optical element for splitting the first beam into multiple beams, and
   a second diffractive optical element for splitting the multiple beams into the second beams, the second beams being arranged in a plurality of subsets, with a subset of the second beams comprising a multiplicity of the second beams.

12. The system according to claim 11, wherein the pattern generator includes means for controlling a pitch between at least one of the subsets of beams and the beams in the subsets of beams.

13. The system according to claim 1, wherein the pattern generator includes a two-dimensional diffractive optical element that generates the second beams.

14. The system according to claim 1, wherein the pattern generator includes an optical element for projecting and focusing the plurality of second beams onto the magnetic tape.

15. The system according to claim 14, wherein the optical element is a lens.

16. The system according to claim 1, wherein the pattern generator includes at least one refractive segmented mirror that at least one of reflects and transmits the first beam to produce the plurality of second beams.

17. The system according to claim 16, wherein the pattern generator includes at least two refractive segmented mirrors that are arranged sequentially.

18. The system according to claim 1, wherein the pattern generator includes polarizing optical elements that divide the first beam into two beams of substantially equal intensity.

19. The system according to claim 16, wherein the pattern generator includes polarizing optical elements that divide each of the second beams into two respective beams of substantially equal intensity.

20. The system according to claim 1, wherein the servo track comprises servo marks arranged along the servo track.

21. The system according to claim 20, wherein the controller controls the intensity so as to intermittently produce the servo marks.

22. The system according to claim 20, wherein the controller controls the intensity so as to control the size of the servo marks marked on the magnetic tape.

23. The system according to claim 1, wherein the marking mechanism includes a stabilizer having a flat surface, with the recording side of the magnetic tape being urged against the flat surface as the magnetic tape passes over the flat surface, thereby maintaining a focus of the second beams with respect to the non-recording side of the passing tape during the formation of the optically detectable servo tracks.

24. The system according to claim 23, wherein the flat surface comprises a ceramic material.

25. The system according to claim 23, wherein the stabilizer includes a mechanical stop disposed proximate to the flat surface for interfering with lateral movement of the passing magnetic tape, thereby reducing the lateral movement during marking by the laser.

26. The system according to claim 1, further comprising a cleaner for removing debris from the tape as the tape passes through the marking area, thereby preventing particulate debris from fouling the magnetic tape.

27. The system according to claim 26, wherein the cleaner includes a gas flow generator providing a flow of gas across a surface of the magnetic tape, for carrying debris away from the tape.

28. The system according to claim 26, wherein the cleaner includes a tape cleaner in contact with a surface of the magnetic tape for removing debris therefrom.

29. The system according to claim 1, further comprising a burnisher for burnishing the magnetic tape.

30. The system according to claim 1, further including a verification sensor capable of detecting the servo track and of measuring a characteristic of the servo track, the characteristic being representative of successful recording of the servo track on to the magnetic tape.

31. The system according to claim 30, wherein the verification sensor includes control means for controlling the marking mechanism, in response to the characteristic representative of successful recording of the servo track on the magnetic tape.

32. The system according to claim 30, wherein the verification sensor includes an edge detector for detecting a lateral tape movement of the magnetic tape.

33. The system according to claim 30, wherein the verification sensor includes an optical sensor for detecting an optically detectable characteristic of the servo track.

34. The system according to claim 33, wherein the optical sensor is a scanning optical sensor.

35. The system according to claim 20, further including a verification sensor capable of detecting the servo track, wherein the verification sensor includes an optical sensor for detecting an optically detectable characteristic representative of the presence of the servo mark on the servo track.

36. The system according to claim 35, wherein the verification sensor includes means for detecting an optically detectable characteristic representative of the size of the servo mark on the magnetic tape.

37. The system according to claim 35, wherein the verification sensor includes means for detecting an optically detectable characteristic representative of the location of a mark on the magnetic tape.

38. An adaptor board capable of being integrated into a system for producing servo tracks on a magnetic tape, comprising
   a guide assembly for carrying magnetic tape through a marking area, and
   a marking mechanism for inscribing a plurality of servo tracks onto the magnetic tape, the marking mechanism including
      a laser for projecting a laser beam along an optical path,
      a beam forming device disposed within the optical path and capable of controlling characteristics of the laser beam to form a conditioned beam having a selected beam size and power, and
      a pattern generator for forming the conditioned laser beam into a plurality of spaced-apart second beams, and for projecting the plurality of spaced-apart second beams into the marking area for forming the plurality of servo tracks on the magnetic tape.

39. The adaptor board of claim 38, wherein the guide assembly includes rollers.

40. The adaptor board of claim 38, wherein the guide assembly includes a stabilizer having a flat surface, with the magnetic tape being urged against the flat surface as the magnetic tape passes over the flat surface, thereby maintaining a focus of the second beams with respect to the passing tape during the formation of the optically detectable servo tracks.

41. The adaptor board according to claim 40, wherein the stabilizer includes a mechanical stop disposed proximate to the flat surface for interfering with lateral movement of the passing magnetic tape, thereby reducing the lateral movement during the formation of the plurality of servo tracks on the magnetic tape.

42. The adaptor board of claim 38, wherein the pattern generator includes
   a beam separator that splits the conditioned beam into the plurality of the spaced- apart intermediate beams;
   a diffractive optical element that splits each of the intermediate beams into a respective subset of the plurality of spaced-apart second beams; and
   at least one focusing element that projects the subsets of spaced-apart second beams on the magnetic tape.

* * * * *